United States Patent
Gibson et al.

(10) Patent No.: US 10,121,159 B2
(45) Date of Patent: Nov. 6, 2018

(54) POLLING STATEMENT FEEDBACK SYSTEM AND METHODS

(71) Applicant: NCR Corporation, Duluth, GA (US)

(72) Inventors: Ray A. Gibson, Lewisville, TX (US); Michael Cain Finley, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 800 days.

(21) Appl. No.: 14/170,183

(22) Filed: Jan. 31, 2014

(65) Prior Publication Data

US 2015/0220947 A1    Aug. 6, 2015

(51) Int. Cl.
G06Q 10/00 (2012.01)
G06Q 30/00 (2012.01)
G06Q 30/02 (2012.01)

(52) U.S. Cl.
CPC .................. *G06Q 30/0203* (2013.01)

(58) Field of Classification Search
None
See application file for complete search history.

(56) References Cited

U.S. PATENT DOCUMENTS

| | | | | |
|---|---|---|---|---|
| 4,954,699 A * | 9/1990 | Coffey | ............... | G06Q 30/02 235/375 |
| 5,751,956 A * | 5/1998 | Kirsch | ............ | G06F 17/30876 707/E17.112 |
| 6,308,893 B1 * | 10/2001 | Waxelbaum | ........ | G06K 7/10851 235/472.01 |
| 7,406,516 B2 * | 7/2008 | Davis | ............... | G06F 11/3495 709/224 |
| 8,332,232 B2 * | 12/2012 | Nickerson | ............. | G06Q 30/02 705/1.1 |
| 8,504,410 B2 * | 8/2013 | Pasta | ................... | G06Q 30/02 705/14.27 |
| 8,595,061 B2 * | 11/2013 | Falk | .................. | G06Q 30/0255 705/14.23 |

(Continued)

FOREIGN PATENT DOCUMENTS

KR    101667552 B1 *    10/2016

OTHER PUBLICATIONS

Loebbecke, Claudia. "Use of innovative content integration information technology at the point of sale." (2007): 228-236. (Year: 2007).*

(Continued)

*Primary Examiner* — Alan S Miller
(74) *Attorney, Agent, or Firm* — Schwegman, Lundberg & Woessner

(57) ABSTRACT

Various systems, methods, and apparatuses are described for determining feedback to a polling statement. One example method may comprise generating a barcode associated with a response to a polling statement. The example method may further comprise enabling display of the barcode for receiving feedback on the polling statement via scanning of the barcode. Another example method may comprise generating a barcode associated with a response to a polling statement. The other example method may further comprise receiving feedback on the polling statement based at least in part on at least one individual scanning the barcode. Similar and related methods, apparatuses, systems, and computer program products are also provided.

20 Claims, 6 Drawing Sheets

(56) References Cited

U.S. PATENT DOCUMENTS

| | | | | |
|---|---|---|---|---|
| 8,733,657 B2* | 5/2014 | Harris | | G06K 19/06028 235/375 |
| 9,223,885 B2* | 12/2015 | Marsico | | G06F 17/30879 |
| 9,727,884 B2* | 8/2017 | Weiss | | G06Q 30/0211 |
| 9,846,863 B2* | 12/2017 | Grossi | | G06Q 20/12 |
| 2001/0037206 A1* | 11/2001 | Falk | | G06Q 30/02 705/1.1 |
| 2002/0010661 A1* | 1/2002 | Waddington | | G06Q 10/08 705/28 |
| 2004/0103023 A1* | 5/2004 | Irwin | | G06Q 30/02 705/14.26 |
| 2008/0097769 A1* | 4/2008 | Galvin | | G06Q 30/0281 705/346 |
| 2008/0169352 A1* | 7/2008 | Harris | | G06K 19/06028 235/494 |
| 2008/0205655 A1* | 8/2008 | Wilkins | | G06Q 10/10 380/279 |
| 2009/0089111 A1* | 4/2009 | Walker | | G06Q 10/06 705/7.29 |
| 2011/0106721 A1* | 5/2011 | Nickerson | | G06Q 30/02 705/347 |
| 2011/0225053 A1* | 9/2011 | Durst | | G06Q 30/02 705/14.73 |
| 2012/0016760 A1* | 1/2012 | Lee | | G06Q 20/20 705/23 |
| 2012/0041823 A1* | 2/2012 | Khan | | G06Q 30/0267 705/14.64 |
| 2012/0084120 A1* | 4/2012 | Hirsch | | G06Q 30/02 705/7.32 |
| 2012/0089471 A1* | 4/2012 | Comparelli | | G06Q 20/20 705/18 |
| 2012/0116878 A1* | 5/2012 | Falk | | G06Q 30/0255 705/14.53 |
| 2013/0018701 A1* | 1/2013 | Dusig | | G06Q 30/02 705/7.32 |
| 2013/0035787 A1* | 2/2013 | Canter | | G07F 11/00 700/232 |
| 2013/0048710 A1* | 2/2013 | Marsico | | G06F 17/30879 235/375 |
| 2013/0110607 A1* | 5/2013 | Basmajian | | G06Q 30/0234 705/14.26 |
| 2013/0181057 A1* | 7/2013 | Harris | | G06K 19/06028 235/494 |
| 2013/0191180 A1* | 7/2013 | Teo | | G06Q 30/02 705/7.32 |
| 2014/0061292 A1* | 3/2014 | Meyers | | G06Q 30/02 235/375 |
| 2014/0081783 A1* | 3/2014 | Paranjape | | G06Q 20/20 705/21 |
| 2014/0304077 A1* | 10/2014 | Wingle | | G06Q 30/0241 705/14.61 |
| 2014/0337098 A1* | 11/2014 | Ganesh | | G06Q 30/0203 705/7.32 |
| 2015/0012339 A1* | 1/2015 | Onischuk | | G07C 13/00 705/12 |
| 2015/0041530 A1* | 2/2015 | Burkhart | | G06K 19/06037 235/375 |

OTHER PUBLICATIONS

Cata, Teuta, Payal S. Patel, and Toru Sakaguchi. "QR code: A new opportunity for effective mobile marketing." Journal of Mobile Technologies, Knowledge and Society 2013 (2013): 1. (Year: 2013).*

* cited by examiner

Did you find the restroom clean?

Yes  No

POLLING STATEMENT FEEDBACK SYSTEM AND METHODS

BACKGROUND OF THE INVENTION

The advancement of technology has broadened the capabilities of devices, creating opportunities for new and advanced solutions to common problems. These advances in technology enable providers, such as retailers and service providers (e.g., food service providers), to continue making improvements to the customer experience, as demanded by their customers.

One area still requiring improvement for providers involves receiving feedback from customers and/or staff. Many customer surveys are generic and don't provide quick or immediate feedback. Preparing and distributing the surveys may also be complex, time-consuming, and inefficient for providers. In addition, by the time the provider receives the results of the survey, it may be too late to resolve all or a part of the issues identified in the survey. Furthermore, surveys are often seen as intrusive and time-consuming to the individuals that are asked to respond. As a result, providers run the risk of upsetting their customers by bothering them with surveys that don't provide them timely feedback.

Accordingly, it may be desirable to provide a method for determining feedback to a polling statement that is fast and convenient for both the providers and the customers, thereby avoiding the above, and other, drawbacks associated with the current art.

BRIEF SUMMARY OF THE INVENTION

Various embodiments of the present invention provide systems, methods, apparatuses, and computer program products for determining feedback to a polling statement.

An example method for determining feedback to a polling statement may comprise generating a barcode associated with a response to a polling statement; and enabling display of the barcode for receiving feedback on the polling statement via scanning of the barcode.

An example method for determining feedback to a polling statement may comprise generating a barcode associated with a response to a polling statement; and receiving feedback on the polling statement based at least in part on at least one individual scanning the barcode.

An example system may comprise a generating module configured to generate a barcode associated with a response to a polling statement; and a determining module configured to determine a result of the polling statement based at least in part on feedback received via scanning of the barcode.

BRIEF DESCRIPTION OF THE DRAWINGS

Figure 1:
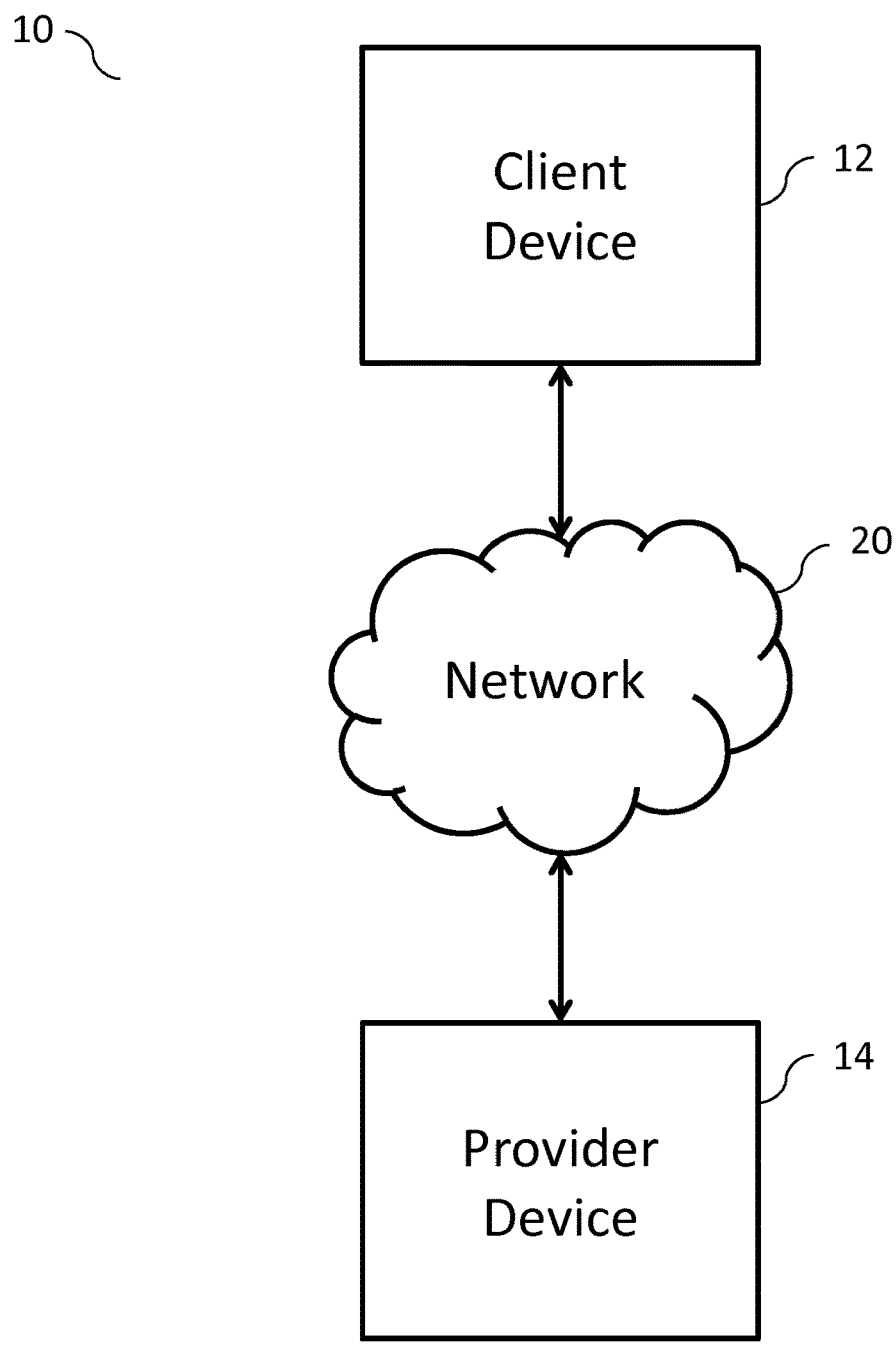

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:

FIG. 2 provides an example of a polling statement with a single barcode response according to an example embodiment of the present invention.

Figure 3:
Figure 3:

FIG. 3 provides an example of a polling statement with multiple barcode responses according to an example embodiment of the present invention.

Figure 4A:
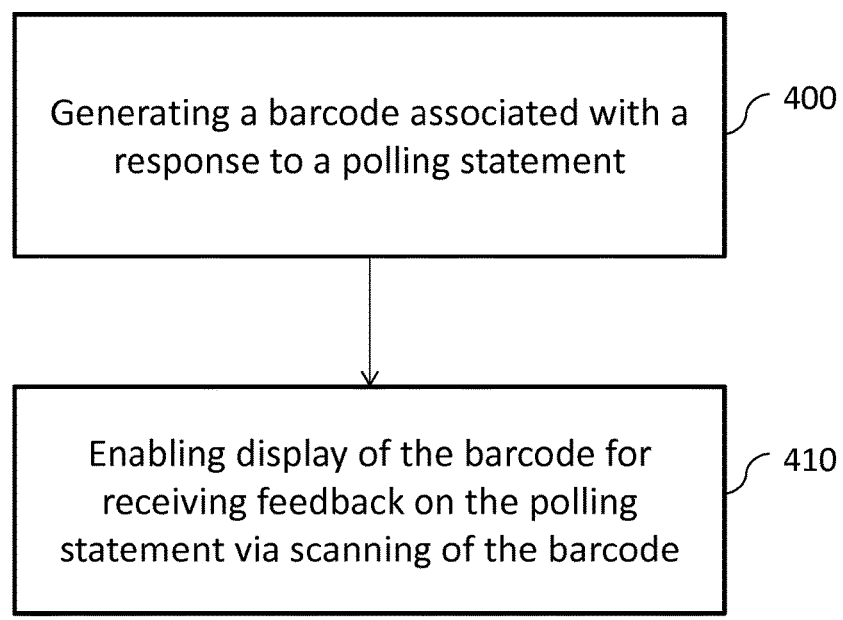

FIG. 4A provides a flowchart for determining feedback to a polling statement according to an embodiment of the present invention.

Figure 4B:
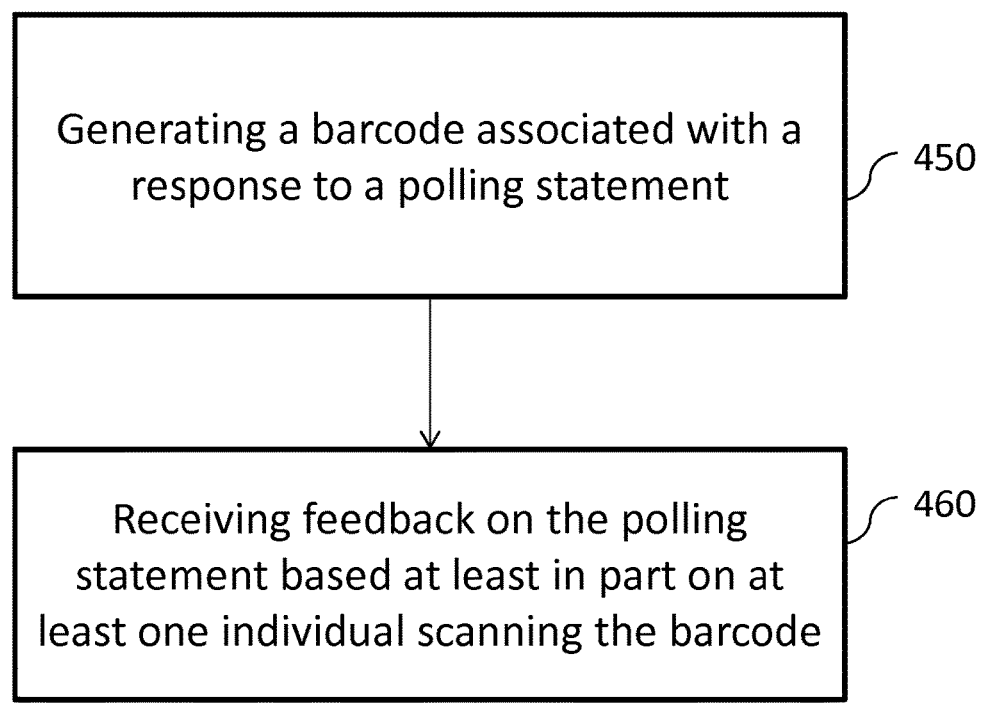

FIG. 4B provides a flowchart for determining feedback to a polling statement according to an embodiment of the present invention.

Figure 5:
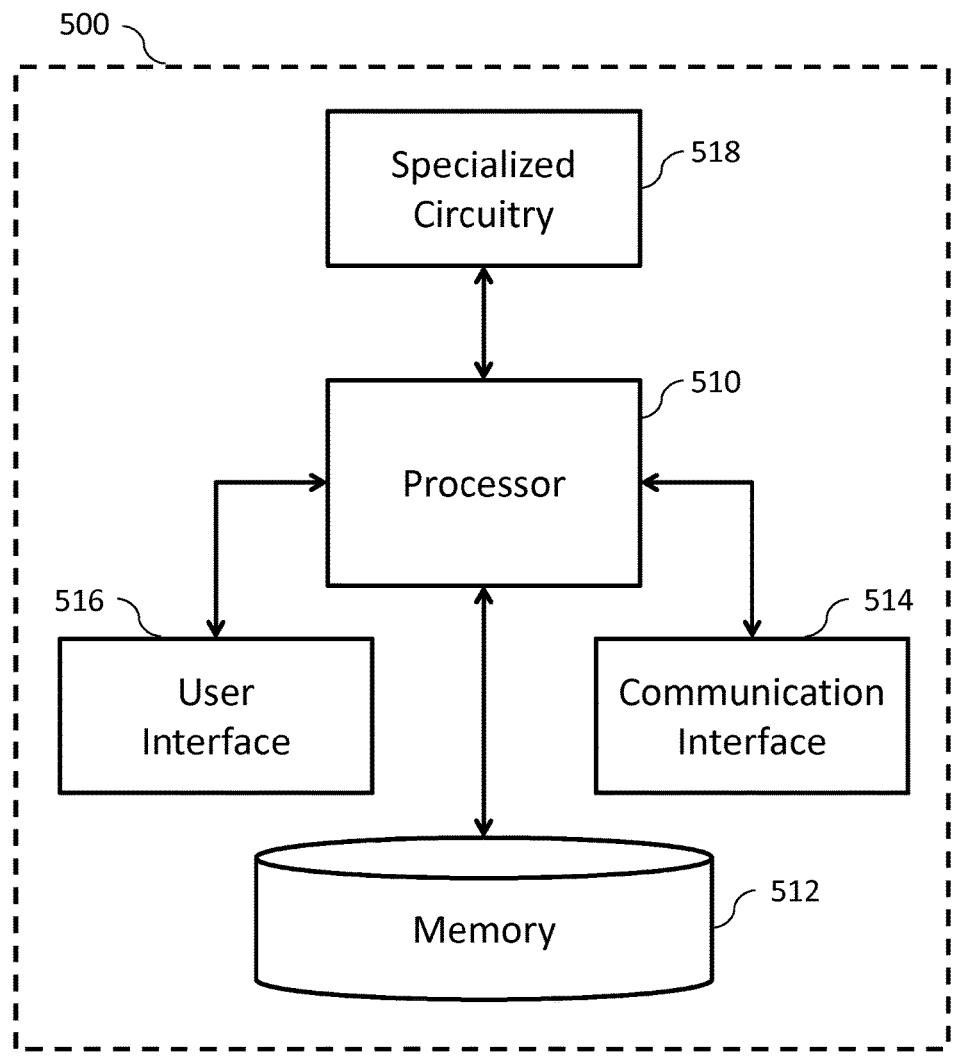

FIG. 5 provides a schematic diagram of a generic apparatus according to an embodiment of the present invention.

DETAILED DESCRIPTION OF THE INVENTION

Various embodiments of the present invention provide a way for a provider to generate and receive real-time feedback on a polling statement. For example, a provider may determine a polling statement for which he would like to receive feedback. The provider may use a provider device to generate a barcode for each potential response to the polling statement. The provider may then display the polling statement along with the potential responses and associated barcodes. An individual, such as a client or customer, may scan the barcode corresponding to the response with which the individual believes is the answer to the polling statement. The provider may receive feedback on the one or more responses to the polling question based on individuals scanning the barcodes associated with the responses.

FIG. 1 provides an illustration of a system 10 according to various embodiments of the present invention. An example system 10 may comprise a client device 12 and/or a provider device 14. The client device 12 may be a device operated by a customer. In some instances, the client device 12 may comprise a mobile device (e.g., a mobile phone, smart phone, or tablet), a barcode scanner or barcode scanning device, and/or the like. The provider device 14 may be a device operated by a merchant, a service provider, and/or the like. In some instances, the provider device 14 may comprise a point-of-sale device or terminal, a server (e.g., a point-of-sale server), a mobile device, and/or the like. Certain embodiments may lack one or more of the described entities of the system 10 and/or may have more than one of a particular entity. For example, a first provider device 14 may be used to generate a barcode, and a second provider device 14 may be used to receive and/or display feedback associated with the barcode.

The various entities of the system 10 may be in communication with one another, for example via network 20. Network 20 may comprise wired and/or wireless connections.

In various embodiments, the system 10 may be implemented at an establishment, such as a retail or restaurant environment. The establishment may operate one or more provider devices 14. For example, the establishment may operate a first provider device 14 in the form of a point-of-sale terminal and a manager or owner of the establishment may operate a second provider device 14 in the form of a mobile device. In some instances, the manager or owner of the establishment may operate the mobile provider device 14 in or proximate the establishment, while in other instances the manager or owner may operate the mobile provider device 14 from a location remote from the establishment. In other examples, the first and second provider device 14 may be a single provider device 14. The establishment may have one or more clients (e.g., customers). Some of the clients of the establishment may possess a client device 12. The client devices 12 may interact with the one or more provider devices 14 to determine feedback to a polling statement.

It should be noted that other system architectures are contemplated that may be used to practice various aspects of the invention. Thus, the system 10 provided in FIG. 1 is for illustrative purposes only and should not be construed to limit the scope of the invention. Further, while FIG. 1 illustrates certain system entities as separate, standalone entities, the various embodiments are not limited to this particular architecture. Further still, while the system 10 above is described as being implemented at an establishment, the system 10 may be implemented in other locations.

Turning to the operation of the system 10, in various embodiments, a provider, such as a manager or owner of an establishment, may desire to receive feedback associated with a polling statement from one or more individuals. In this regard, the provider may be interested in receiving feedback from her clients (e.g., customers) and/or employees. The polling statement may be a declarative statement for which a provider wishes to receive agreement from her clients. For example, the statement may be "I received excellent service today." In other instances, the polling statement may be a question for which the customer can provide one of multiple responses. For example, the statement may be "How was the service you received today?" and the potential responses may be "poor," "good," and "excellent."

According to example embodiments, the provider device 14 may be configured to receive input from the provider defining the statement. In this regard, the provider device 14 may provide a user interface that receives the provider input. The provider device 14 may present the user interface via an application, a mobile app, a web page or web app, and/or the like.

The provider device 14 may generate at least one barcode representing a response to the statement. The barcode may be linear, one-dimensional (e.g., a Universal Product Code (UPC) symbol), two-dimensional (e.g., a Quick Response (QR) code), and/or the like. In some instances, the provider device 14 may generate a single barcode associated with a response agreeing with the corresponding statement. For example, if the statement was "Scan here if the restroom was clean," the barcode would represent a response that the scanner agreed with the statement. In other instances, the provider device 14 may generate a separate barcode for each potential response to the statement. For example, if the statement was "Did you find the restroom clean?" one barcode may represent a "yes" response and another barcode may represent a "no" response.

In various embodiments, the barcode generated by the provider device 14 may encode information associated with the statement and/or response. For example, the barcode may contain a link (e.g., a web link, a link to launch an application, etc.), an identifier, and/or the like.

The provider device 14 may associate the barcode with the statement. In this regard, the provider device 14 may maintain a link between the statement and the associated barcode response(s).

The barcode may be generated and/or associated with the statement locally or at a remote device. For example, a provider device 14 may request a remote device generate and return a barcode to be associated with the statement by the provider device 14. If generated remotely, the provider device 14 may receive the barcode via an application (e.g., a mobile application), email, text message, web page, and/or the like.

According to various embodiments, the provider device 14 may provide for displaying the statement and/or barcode.

In example embodiments, the statement and/or barcode may be displayed electronically. For example, the provider device 14, or another device, may display the statement and/or barcode on a screen/monitor or digital sign. The statement and/or barcode may be displayed on multiple screens throughout the establishment or multiple establishments. In some instances, the same barcode for a particular response may be displayed on each of the screens. In other instances, the barcode generated and displayed for a particular response to the statement may differ from one display to another or from one establishment to another. The differing barcodes may allow the provider device 14 to track where the responses are received.

In other example embodiments, the statement and/or barcode may be displayed in print form. In this regard, the provider device 14 may be configured to print or enable printing of the statement and/or barcode(s). As above, more than one copy of the statement and/or barcode may be printed, and each copy may use the same or a different barcode for a particular answer. The printed statement and/or barcode may be printed on a sheet of paper, as a table tent, directly onto a product or device, and/or the like.

The statement and/or barcode may be displayed at a location relevant to the statement. The statement and/or barcode may be displayed at a register, kiosk, point-of-sale device, door, table, shelf, or near an item or location referenced in the statement. For example, if the statement is related to the cleanliness of the restroom, the statement and/or barcode may be displayed near the restroom. This way, clients may be more likely to respond to the statement.

According to some embodiments, a client may use a client device 12 to scan a barcode associated with a statement. For example, the client may use a client device 12 to scan a barcode indicating agreement with a statement or a barcode associated with a particular response to the statement.

The client device 12 may scan the barcode using a camera or scanner integrated, associated, or in communication with the client device 12. The camera or scanner may be accessed by the client device 12 via an application running on the client device 12, such as a mobile app.

The client device 12 may determine information encoded in the barcode. The client device 12 may take an action with respect to the information encoded in the barcode. In some instances, the client device 12 may determine and/or store information associated with the scanning of the barcode. For example, the client device 12 may determine the time of day, location where the scanning took place, and/or the like.

In some instances, the barcode may comprise an identifier associated with the response represented by the barcode. The identifier encoded in the barcode may be used by the client device 12 to provide feedback to a provider device 14. For example, the client device 12 may use a mobile app to send the identifier to a provider device 14 indicating that the barcode associated with the identifier was scanned.

In other instances, the client device 12 may determine a link encoded in the barcode. For example, the link may be a web link that the client device 12 may follow to provide an indication that the barcode was scanned. In this example, the web link may be unique to the barcode and a count associated with the barcode may be incremented when the client device 12 follows the link. In another example, the link may be a link to launch an application (e.g., a mobile app) that may be used to provide an indication that the barcode was scanned. In this example, the application launch link may further comprise information (e.g., an identifier) associated with the barcode that may be used to indicate the barcode was scanned.

In example embodiments, the client device 12 may receive a response to scanning the barcode. For example, the client device 12 may receive a response via a web app executing on the client device 12 that the barcode was successfully scanned. In another example, the client device 12 may receive a response from another entity (e.g., a provider device 14) indicating that the response has been received. The response may indicate that a count associated with the barcode has been incremented. The client device 12 may display one or more of the responses to the user of the client device 12 (e.g., the client).

According to various embodiments, the client device 12 and/or a provider device 14 may request additional information from the client. The additional information may be information related to the client. For example, the additional information may comprise personal information, identification information, loyalty information, and/or the like. The additional information may be related to an additional statement or question. In some instances, the additional statement or question may be related to, or a follow-up to, the original statement. The additional question may request additional details related to the client's response to the original statement. For example, the additional question may ask why the service was poor or what needs attention in the restroom. In other instances, the additional statement or question may be a survey, which may or may not be related to the original statement.

In some instances, a provider device 14 may send a request to the client device 12 to request the additional information. In other instances, the client device 12 may request the additional information from the client without input from a provider device 14. In certain instances, the client device 12 may request the additional information from the client via a user interface of the client device 12. In other instances, the client device 12 and/or provider device 14 may obtain the additional information from the client via a web interface. For example, scanning the barcode may launch a web site through which the client may provide additional information.

According to various embodiments, the provider device 14 may be configured to receive an indication that a barcode associated with a response has been scanned. The indication may contain information associated with the barcode itself and/or information associated with the scanning of the barcode. The provider device 14 may receive the response in real-time or at any time subsequent to the scanning.

In some instances, the provider device 14 may receive an indication from a client device 12. For example, the provider device 14 may receive an identifier from the client device 12 identifying the barcode that was scanned by the client device 12. The indication may be sent by a mobile app executing on the client device 12 and may be received by the same or a different mobile app executing on the provider device 14. The provider device 14 may increment a count associated with the barcode. The provider device 14 may store additional information associated with the scanning (e.g., the time the scan took place).

In other instances, the provider device 14 may receive an indication of the scan other than from the client device 12. The indication may be in the form of updated data, a message (e.g., email, text message, message within a mobile app), and/or the like. For example, when the client device 12 follows a web link to increment a count, the provider device 14 may monitor the count and receive an indication that the count has been incremented. In another example, the indication received by the provider device 14 may be receiving data including the updated count or counts from the scanning of one or more barcodes.

According to example embodiments, the provider device 14 may be configured to display results related to the statement. The provider device 14 may display the results via a message (e.g., pop-up message), web site, application, web app, and/or the like. The provider device 14 may display the results in real-time to enable real-time feedback to a user of the provider device 14.

In some instances, the provider device 14 may display each individual result to a user of the provider device 14. In other instances, the provider device 14 may aggregate all of the results that have been received and display the total results to the user. For example, the provider device 14 may aggregate the data associated with the scanning of the barcode(s) and generate and/or display a chart, count, or other visual, or other, indication or representation to the user. Both individual and total results may be displayed to the user in certain embodiments. In some embodiments, the provider device 14 may send the results to another provider device 14 to be aggregated and/or displayed to a user of the other provider device 14.

The provider device 14 may determine and/or display one or more trends in the results of the scanning of the barcodes. For example, the provider device 14 may determine and/or display that responses to a particular statement have recently begun a trend of increasing or decreasing. In another example, the provider device 14 may determine that the response to a particular statement has recently begun a trend of switching from one response to another (e.g., trending from positive to negative responses).

In various embodiments, the provider device 14 may enable a user of the provider device 14 to take one or more actions in response to viewing the responses. The provider device 14 may permit the user to notify a person (e.g., an employee) to which the responses are relevant. For example, the provider device 14 may permit the user to notify an employee that they have received negative feedback, or notify a restroom attendant that the restroom needs to be cleaned. Other actions may be facilitated by the provider device 14 for reporting or resolving an issue related to the results.

The provider device 14 may be configured to enable a user to reset the results associated with a statement. In some instances, only specifically identified results may be reset, while in other instances, all results for a particular statement may be reset. In this regard, the provider device 14 may permit a user to reset the results for a statement when an action has been taken to resolve an issue or report a problem related to the statement. For example, if responses to a statement indicate that a restroom needs to be cleaned and in response the restroom gets cleaned, the responses to the statement may be reset to begin monitoring for the next time the restroom becomes dirty.

Various modifications may be made to the above described embodiments within the scope of the invention. For example, in some embodiments, the barcodes may be replaced by short-range radio transmitters (e.g., radio-frequency identification (RFID) tags, near field communication (NFC) tags, etc.) that may communicate with the client device 12. For example, a client may move client device 12 proximate the transmitter (e.g., by "tapping" the transmitter with the client device 12) to initiate communication and signal a response.

In other embodiments, the results associated with the responses may be aggregated, calculated, and manipulated by an entity other than the provider device 14. In these embodiments, the provider device 14 may receive the results from the other entity rather than performing the aggregation and calculation itself.

FIG. 4A provides a flowchart according to an example method for determining feedback to a polling statement. The operations performed by a method, apparatus, and computer program product of this example embodiment are illustrated from the perspective of an apparatus 500 embodied as a provider device 14. The apparatus 500 embodied by the provider device 14 may comprise means, such as the specialization circuitry 518, the processor 510, or the like. In this example embodiment, the various operations may be performed by the specialized circuitry 518 embodied as polling feedback circuitry. At operation 400, the example method may comprise generating a barcode associated with a response to a polling statement. The example method may further comprise enabling display of the barcode for receiving feedback on the polling statement via scanning of the barcode at operation 410.

FIG. 4B provides a flowchart according to an example method for determining feedback to a polling statement. The operations performed by a method, apparatus, and computer program product of this example embodiment are illustrated from the perspective of an apparatus 500 embodied as a provider device 14. The apparatus 500 embodied by the provider device 14 may comprise means, such as the specialization circuitry 518, the processor 510, or the like. In this example embodiment, the various operations may be performed by the specialized circuitry 518 embodied as polling feedback circuitry. At operation 400, the example method may comprise generating a barcode associated with a response to a polling statement. The example method may further comprise receiving feedback on the polling statement based at least in part on at least one individual scanning the barcode at operation 410.

Various embodiments provide numerous benefits and advantages to both clients and providers. Some advantageous embodiments permit a provider to receive instant feedback to a question from one or more clients. Furthermore, these advantageous embodiments permit the provider to create as many new polls as desired quickly and easily. In example advantageous embodiments, responses to the polling statement or question may indicate trends that are important for the provider to monitor but for which are otherwise difficult to receive feedback for in real-time. These advantageous embodiments are easy and fast for both the provider and the client, and provide a very flexible solution.

The operations of the methods described herein may be carried out in any suitable order, or simultaneously where appropriate. The methods described herein may be performed by software in machine readable form on a tangible storage medium or as a propagating signal.

In various embodiments, a client device 12 and/or provider device 14 may be embodied as or otherwise include an apparatus 500 as generically represented by the block diagram of FIG. 5. In the example embodiment, the apparatus 500 may comprise various means for performing the various functions herein described. These means may comprise one or more of a processor 510, memory 512, communication interface 514, user interface 516, or specialized circuitry 518. The various means may be in communication with one another, such as via a bus.

The means of the apparatus 500 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 512) that is executable by a suitably configured processing device (e.g., the processor 510), or some combination thereof. In some example embodiments, the processor 510, memory 512, communication interface 514, user interface 516, and/or specialized circuitry 518 may be embodied as a chip or chip set.

The processor 510 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 5 as a single processor, in some embodiments the processor 510 may comprise a plurality of processors. The plurality of processors may be in operative communication with each other and may be collectively configured to perform one or more functionalities of the apparatus 500 as described herein. The plurality of processors may be embodied on a single device or distributed across a plurality of devices collectively configured to function as the apparatus 500.

In some example embodiments, the processor 510 may be configured to execute instructions stored in the memory 512 or memory otherwise accessible to the processor 510. These instructions, when executed by the processor 510, may cause the apparatus 500 to perform one or more of the functionalities of the apparatus 500 as described herein. Further, the processor 510 may comprise functionality to operate one or more software programs, which may be stored in memory. For example, the processor 510 may be capable of operating a connectivity program, such as a web browser. The connectivity program may allow the apparatus 500 to transmit and receive web content, such as location-based content, according to a protocol, such as Wireless Application Protocol (WAP), hypertext transfer protocol (HTTP), and/or the like. The apparatus 500 may be capable of using protocol(s), such as Transmission Control Protocol/Internet Protocol (TCP/IP), to transmit and receive web content across the internet or other networks.

The memory 512 may comprise, for example, volatile memory, non-volatile memory, or some combination thereof. In this regard, the memory 512 may comprise one or more tangible and/or non-transitory computer-readable storage media that may include volatile and/or non-volatile memory. Although illustrated in FIG. 5 as a single memory, the memory 512 may comprise a plurality of memories. The plurality of memories may be embodied on a single device or may be distributed across a plurality of devices collectively configured to function as the apparatus 500. In various example embodiments, the memory 512 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 512 may be configured to store information, data, applications (e.g., software programs), instructions, and/or the like, in some instances for execution by the processor 510, for enabling the apparatus 500 to carry out various functions in accordance with various example embodiments.

The communication interface 514 may be embodied as any device or means embodied in circuitry, hardware, a computer program product comprising computer readable program instructions stored on a computer readable medium (for example, the memory 512) and executed by a processing device (for example, the processor 510), or a combination thereof that is configured to receive and/or transmit data from/to another computing device. The communication interface 514 may include, for example, an antenna, a transmitter, a receiver, a transceiver, and/or supporting hardware or software for enabling communications with one or more remote devices. The communication interface 514 may be configured to receive and/or transmit data using any protocol that may be used for communications between devices.

The user interface 516 may be in communication with the processor 510 to receive an indication of a user input and/or to provide an audible, visual, mechanical, or other output to a user. As such, the user interface 516 may include, for example, a keyboard, keypad, scanner, printer, mouse, joystick, display (e.g., touch screen display), microphone, speaker, and/or other input/output mechanisms. The processor 510 and/or user interface circuitry comprising the processor 510 may be configured to control one or more functions of the user interface 516 through computer program instructions (e.g., software and/or firmware) stored on memory (e.g., memory 512) accessible to the processor 510.

The specialized circuitry 518 may be embodied as various means, such as circuitry, hardware, a computer program product comprising computer readable program instructions stored on a computer readable medium (for example, the memory 512) and executed by a processing device (for example, the processor 510), or some combination thereof and, in some embodiments, is embodied as or otherwise controlled by the processor 510.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   providing an interface for receiving a polling statement from a provider interacting through the interface on a provider-operated device;
   generating a barcode associated with a response to the polling statement;
   displaying the barcode on a display of a first device for receiving feedback on the polling statement via scanning of the barcode from a second device;
   receiving an indication that the second device scanned the barcode on the first device from a web application that is processed when a web linked is activated through the scanning of the barcode by launching a mobile application on the second device when the barcode is scanned by the second device and the mobile application automatically communicating with the web application and providing the indication once launched, wherein the web application increments a counter maintained for the barcode, and wherein receiving further includes receiving a current value for the counter from the web application; and
   display the current value on the display of the first device.

2. The method of claim 1, wherein the barcode is selected from the group consisting of a one-dimensional barcode and a two-dimensional barcode.

3. The method of claim 1, wherein the polling statement has more than one response, and wherein generating a barcode further comprises generating a barcode for each of the more than one responses.

4. The method of claim 1, further comprising:
   determining a result of the polling statement based at least in part on feedback received via scanning of the barcode.

5. The method of claim 4, further comprising:
   executing an action based at least in part on the result for resolving an issue identified by the result.

6. The method of claim 5, wherein executing an action further comprises notifying an individual of the issue to be resolved.

7. The method of claim 4, further comprising:
   generating a visual representation of the result of the polling statement for displaying to an end user.

8. The method of claim 4, further comprising:
   identifying a trend in the result of the polling statement.

9. A method comprising:
   providing an interface for receiving a polling statement from a provider interacting through the interface on a provider-operated device
   generating a barcode associated with a response to a polling statement;
   displaying the barcode on a display of a Point-Of-Sale (POS) terminal;
   receiving feedback on the polling statement based at least in part on at least one individual activating a camera of a client device operated by the individual and scanning the barcode displayed on the display of the POS terminal and responsive to the scanning automatically launching on the client device a mobile application and responsive to the launching the mobile application providing the feedback; and
   displaying on the POS terminal a current count for the response based on incrementing a counter when the barcode was scanned from the display of the POS terminal that activates a web link and processes a web application for incrementing the counter.

10. The method of claim 9, further comprising:
    requesting additional information from an individual after the individual scans the barcode.

11. The method of claim 10, wherein requesting additional information further comprises requesting a response to a subsequent polling statement.

12. The method of claim 11, wherein the subsequent polling statement is a survey question.

13. The method of claim 11, wherein the subsequent polling statement is related to the polling statement.

14. The method of claim 9, wherein receiving feedback further comprises receiving real-time feedback.

15. A system comprising:
   a Point-Of-Sale (POS) terminal have a generating module configured to generate a barcode associated with a response to a polling statement, wherein the polling statement received by the POS terminal through an interface that a provider interacts with from a provider operated device, the POS terminal configured to display the barcode on a display of the POS terminal; and
   a server having a determining module configured to determine a result of the polling statement based at least in part on feedback received via scanning of the barcode from a client device operated by a user, wherein the server is further configured to maintain a web link between the barcode and a web application, the web application increments a counter for the response when the barcode is scanned from the client device from the display of the POS terminal by launching a mobile application a mobile application on the client device when the barcode is scanned and the mobile application communicating the feedback to the web application, and the web application is processed upon receiving the feedback from the mobile application, and the server configured to provide a current value for the counter back to the POS terminal, and the POS terminal configured to display the current value associated with the response on the display to the user as the result.

16. The system of claim 15, further comprising:
   a presentation module configured to generate a visual representation of the result for display.

17. The system of claim 15, wherein the determining module determines the result in real time.

18. The system of claim 15, wherein the barcode encodes an identifier associated with the response to the polling statement.

19. The system of claim 15, wherein the feedback received by the determining module comprises additional information related to the scanner of the barcode.

20. The system of claim 15, wherein the feedback received by the determining module comprises additional information related to the scanning of the barcode.

* * * * *